May 4, 1937.  J. H. HUNT  2,079,409

VACUUM OPERATED BRAKE

Filed July 20, 1933

Inventor
John H. Hunt
By Blackmore, Spencer & Flint
Attorneys

Patented May 4, 1937

2,079,409

UNITED STATES PATENT OFFICE 2,079,409

VACUUM-OPERATED BRAKE

John H. Hunt, Detroit, Mich., assignor to General Motors Corporation, Detroit, Mich., a corporation of Delaware Application July 20, 1933, Serial No. 681,267

1 Claim. (Cl. 188—181)

This invention relates to power-operated devices and more particularly to a fluid pressure operating device for actuating vehicle brakes.

An object of the invention is to improve the operation of brakes actuated by fluid pressure means.

A further object is to associate with a vacuum-operated brake actuating mechanism a manually adjustable automatic control for said vacuum-actuating mechanism.

Other objects and advantages will be understood from the following description.

Figure 1:
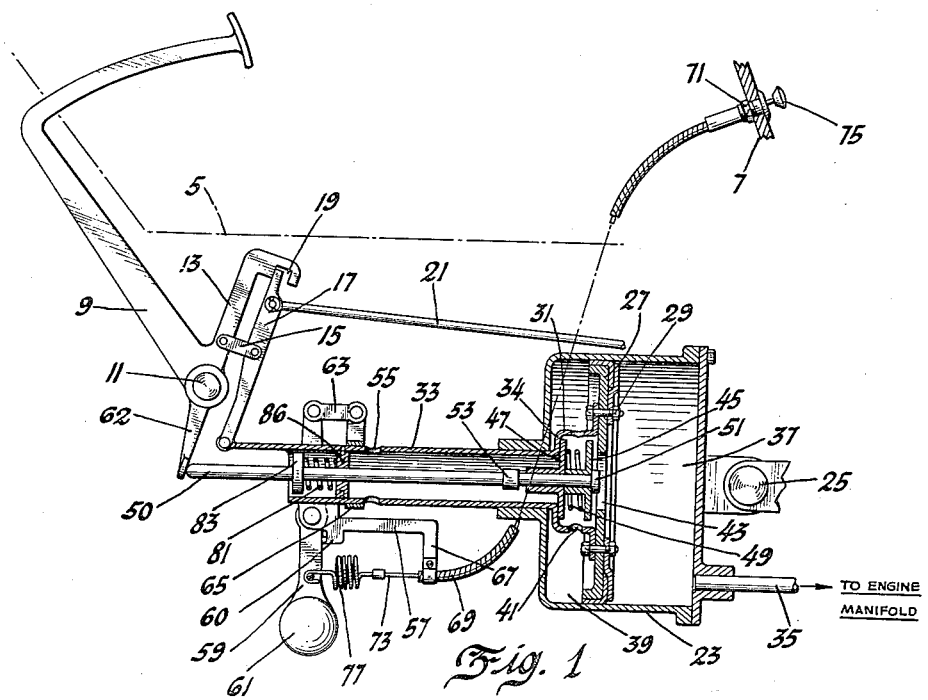

On the accompanying drawing Figure 1 is a view in side elevation, partly in section, of one embodiment of the invention.

Figure 2:
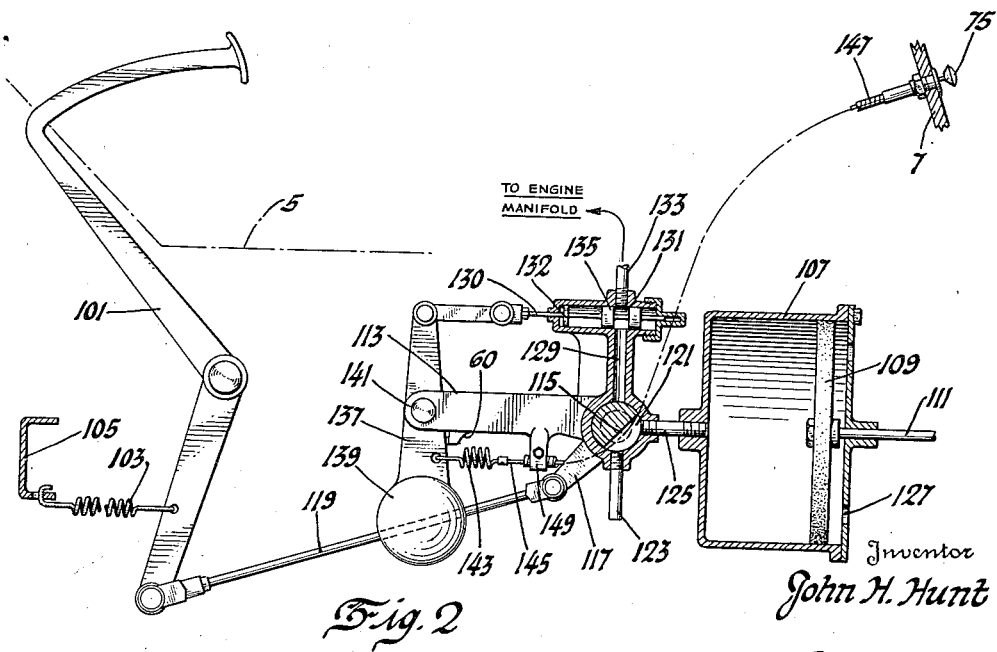

Figure 2 is a similar view of a second embodiment.

Referring to Figure 1, numeral 5 represents the floor boards of an automobile vehicle, and 7 is a part of the instrument board within the operator's compartment. The brake pedal is shown at 9 and is pivoted at 11. This pedal has an arm 13 to which is pivoted by a link 15 a lever 17. The upper end of lever 17 has limited movement within a notch 19 in arm 13. Adjacent this end of the lever 17 there is connected a brake-operating rod 21.

A fluid pressure cylinder 23 is suitably secured pivotally as at 25. Within the cylinder is a piston 27 secured by fastening means 29 to the enlarged end 31 of a hollow piston rod 33, there being a shoulder 34 between the two parts. A conduit 35 connects the chamber 37 of the cylinder to the engine manifold. On the other side of the piston from chamber 37 is a chamber 39 which is in communication with the enlarged head 31 by the provision of openings 41. The piston 27 has an opening 43 which may be closed by a disc-shaped valve 45. The hollow piston rod 33 may be closed from communication with the space within the enlarged head 31 by a second valve 47, this valve being designed to engage the shoulder 34. Reciprocable through the piston rod 33 is a rod 50. The valves 45 and 47 are mounted on this rod between abutments 51 and 53. A spring 49 is located between the valves. This spring tends to hold valve 45 against the end abutment 51 or against the wall of the piston surrounding opening 43. The spring also serves to position the valve 47 against the wall 34. The rod 50 is provided with another abutment 83 which is engaged by a spring 81 seated against a transverse wall 86 within the piston rod. This spring 81 is of sufficient strength to normally hold the rod 50 closely adjacent a depending arm 62 on the pedal 9 whereby the initial movement of the pedal will move the rod 50.

Secured to the piston rod is a bracket 57 to which is pivoted a lever or pendulum 59 having a weight 61 at its lower end. The upper arm of the lever 59 is connected by a link 63 to a ring 65 slidably mounted on the piston rod and adapted to be moved by a clockwise rotation of lever 59 to close a plurality of openings 55 in the piston rod.

An arm 67 of bracket 57 carries clamped thereto the end of a flexible cable housing 69. The other end of the cable housing is secured by suitable fastening means 71 to the instrument board. Through the flexible housing extends an operating cable 73, the instrument board end of the cable being provided with an operating knob 75. Between the other end of the flexible cable and the lever 59 is a spring 77, which spring normally holds the lever against the stop 60. By actuation of the knob 75 the tension of the spring 77 may be varied whereby the resistance to clockwise rotation of the lever may be controlled.

The operation of the device is as follows: When the pedal 9 is released the parts are in the positions as shown. Chamber 37 is evacuated by its connection with the engine manifold through conduit 35. Spring 81 holds the rod 50 in the position shown whereby valve 47 is closed against shoulder 34 by the spring 49 and the openings 43 and 41 cause the left side of the piston to be evacuated. When the pedal is depressed rod 50 is first moved to the right, whereupon the spring 49 closes the valve 45 over the opening 43. Upon a slight further movement of the pedal and rod 51 the abutment 53 moves valve 47 and opens communication between chamber 39 and the atmosphere through the hollow piston rod and openings 55. The unbalanced pressure on the two sides of the piston causes the piston to move to the right, this movement operating through rod 33, lever 17, and brake rod 21 to apply the brake. The movement of the pedal when pushing rod 50 has also caused a relative movement to take place between the upper arm 13 and the upper end of lever 17 such that the upper end of lever 17 lies adjacent the right end wall of the notch 19 (not the left end wall of Figure 1). The subsequent movement of lever 17 by the piston will cause it to swing back toward the position shown. In the event that the pedal movement is stopped the lever will actually rotate back to the position illustrated. If it does reach the position shown, the movement of the piston relative to rod 50 will close the air opening and the brake will be held applied with a given degree of force until the pedal is released to restore the rod 50 to its initial position. Additional brake-applying force is obtained by a continued depression of the brake pedal.

The movement to the right of the piston and its rod 33 exerts a pull on lever 17 tending to rock lever 17. This is resisted by tension in brake rod 21 tending to oppositely rotate lever 17. The tension in rods 33 and 21 operate jointly through link 15 upon the pedal 9 at a point above its pivot, exerting a force tending to rock the pedal clockwise. This force is felt by the operator's foot and gives a "feel" which is proportional to the force of brake application.

The normal application is not interfered with by the inertia device controlled by lever 59. However, should the brake application be unduly severe the inertia of weight 61 will cause it to rotate clockwise and by means of parts 63 and 65 to close openings 55, thus cutting off the admission of air to the chamber 39 and resisting the movement of the piston by suction. Such action as this may occur on a slippery road which offers minimum traction for the wheels. Severe brake application under such circumstances easily stops the wheel rotation and causes the wheel to slide. This ineffective brake application is minimized by the present invention because the inertia of weight 61, while the brake is applied, causes the closure of openings 55 and prevents further braking pressure. To control the extent of the influence of the weight the tension of spring 77 against which the weight must act may be adjusted by the manipulation of knob 75.

In Figure 2 the inertia weight is used to similarly modify the action of a power cylinder, one side of the piston of which cylinder is constantly open to the atmosphere. In this figure 101 is the pedal held to brake-released position by spring 103. This spring may be anchored to any convenient part as to a frame member 105. The power cylinder 107 carriers a piston 109 to which is secured a rod 111, the latter intended to be connected to any suitable brake rodding in such a way that the brake is applied by a movement of the piston to the left. A fixedly mounted bracket member 113 is provided with an opening for a valve 115, the latter rotatable by means of an arm 117 connected by a link 119 to an arm of pedal 101. The valve 115 has a channel 121 by which, when positioned as shown in the figure, it affords communication between a conduit 123 open to the atmosphere and a conduit 125 leading to the power cylinder at the left of the piston. Suitable openings 127 keep the chamber of the cylinder at the right of the piston continuously open to the air. If the pedal is depressed passage 125 may be made to communicate with a passage 129, a cylinder 131, and a conduit 133, the latter leading to the engine manifold. Within the cylinder 131 is a valve 135 connected to an arm of lever 137, the latter having a weight 139. The lever is shown pivoted to the bracket 113 at 141. The lever 137, when at rest and in engagement with its stop 60, holds valve 135 in the position shown. Valve 135 will close the communication between the conduit 133 and the passage 129 when the lever swings clockwise. Such swinging is resisted by a spring 143 attached to the lever near the weight 139 and to a cable or rod 145 reciprocable through a cable housing 147. This housing is anchored at one end to a bracket arm 149 and at its other end to the instrument board 7. On the end of the operating cable is a knob 75 as before.

This second form of the invention operates in much the same way as the other except that the pedal in this form of the invention functions solely to control the fluid power actuator. When the pedal shifts the valve 115 to render the suction line operable through the passages 129 and 125, the unbalanced pressures in the cylinder 107 cause the piston to move to the left and apply the brake. In the event that the brake pressure is too great for the wheel traction, the weighted lever 137 swings clockwise so that the valve 135 closes the suction conduit. This action is resisted by spring 143, and the tension of this spring is controlled by operating the flexible cable from the instrument board as before.

In the event that the weighted lever should be too abrupt in its action, it is obviously possible to introduce any desired form of modifying means. To that end I have shown cylinder 131 somewhat elongated, and carried by the valve rod 130 within the cylinder is a second apertured piston member 132. The reciprocation of the piston 132 provides a dashpot effect to prevent undesired movements of the valve 135 under the influence of the pendulum member 137.

I claim:

Control mechanism for the brakes of a vehicle having an operator's compartment, a cylinder, a piston therein, said cylinder and piston constituting a fluid motor, connections from the piston for applying brakes, valve means to control the flow of gaseous medium to and from one side of said piston whereby the piston is caused to move under unbalanced pressure, manually operable means to control said valve, a pivoted weight and means actuated by said weight when the latter swings upon its pivot under the influence of inertia to modify the action of said fluid motor together with yielding means resisting the movement of said weight under the influence of inertia, and means connected to said yielding means and extending to the operator's compartment whereby the tension of said yielding means may be adjusted.

JOHN H. HUNT.